United States Patent
Weng et al.

(10) Patent No.: US 7,514,491 B2
(45) Date of Patent: Apr. 7, 2009

(54) FUNCTIONALIZED ISOBUTYLENE POLYMER-INORGANIC CLAY NANOCOMPOSITES AND ORGANIC-AQUEOUS EMULSION PROCESS

(75) Inventors: Weiqing Weng, Houston, TX (US); Anthony Jay Dias, Houston, TX (US); Carmen Neagu, Friendswood, TX (US); Beverly Jean Poole, Houston, TX (US); Caiguo Gong, Pearland, TX (US); James Richard Ayers, Highlands, TX (US); Kriss Randall Karp, Copley, OH (US); Molly Westermann Johnston, Baytown, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 647 days.

(21) Appl. No.: 11/184,000

(22) Filed: Jul. 18, 2005

(65) Prior Publication Data
US 2007/0015853 A1    Jan. 18, 2007

(51) Int. Cl.
*C08K 3/34* (2006.01)
(52) U.S. Cl. .................. 524/445; 524/446; 524/447
(58) Field of Classification Search ............... 524/445, 524/446, 447
See application file for complete search history.

(56) References Cited

U.S. PATENT DOCUMENTS

| | | | |
|---|---|---|---|
| 5,576,372 A | 11/1996 | Kresge et al. | 524/442 |
| 5,576,373 A | 11/1996 | Kresge et al. | 524/445 |
| 5,665,183 A | 9/1997 | Kresge et al. | 152/204 |
| 5,721,306 A | 2/1998 | Tsipursky et al. | |
| 5,807,629 A | 9/1998 | Elspass et al. | 428/323 |
| 5,883,173 A | 3/1999 | Elspass et al. | 524/446 |
| 5,936,023 A | 8/1999 | Kato et al. | 524/445 |
| 5,973,053 A | 10/1999 | Usuki et al. | 524/445 |
| 6,034,164 A | 3/2000 | Elspass et al. | 524/445 |
| 6,060,549 A | 5/2000 | Li et al. | 524/445 |
| 6,103,817 A | 8/2000 | Usuki et al. | 524/574 |
| 6,121,361 A | 9/2000 | Usuki et al. | 524/445 |

FOREIGN PATENT DOCUMENTS

| | | |
|---|---|---|
| JP | 2000-16024 | 6/2000 |
| WO | WO 94/22680 | 10/1994 |
| WO | WO 98/03562 | 1/1998 |
| WO | WO 01/85831 | 11/2001 |
| WO | WO 02/100935 | 12/2002 |
| WO | WO 02/100936 | 12/2002 |
| WO | WO 2004/058874 | 7/2004 |
| WO | WO 2004/078839 | 9/2004 |
| WO | WO 2006/071959 | 7/2006 |

OTHER PUBLICATIONS

Abstract for JP 2000-160024, Yuichi et al., published Jun. 13, 2000, entitled "Gas-Barrier Thermoplastic Resin-Elastomer Compositions and Laminates Using Them".

*Primary Examiner*—Edward J Cain
(74) *Attorney, Agent, or Firm*—Catherine L. Bell; Jennifer A. Schmidt

(57) ABSTRACT

A nanocomposite of a halogenated elastomer and an inorganic, exfoliated clay, suitable for use as an air barrier, is disclosed. The halogenated elastomer can be a polymer comprising $C_4$ to $C_7$ isoolefin derived units, para-methylstyrene derived units, and para(halomethylstyrene) derived units, or can be a butyl-type rubber. The nanocomposite can be formed by contacting an aqueous slurry of inorganic clay with a polymer cement while agitating vigorously to form emulsions or micro-emulsions to intimately mix the inorganic clay and the elastomer. The nanocomposite so formed has improved air barrier properties and is suitable for use as an innerliner or innertube.

46 Claims, 1 Drawing Sheet

FUNCTIONALIZED ISOBUTYLENE POLYMER-INORGANIC CLAY NANOCOMPOSITES AND ORGANIC-AQUEOUS EMULSION PROCESS

FIELD OF THE INVENTION

This invention relates to low-permeability nanocomposites useful for air barriers, processes to produce the same, and their use in articles of manufacture.

BACKGROUND OF THE INVENTION

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. Common types of inorganic particles used in nanocomposites are phyllosilicates, an inorganic substance from the general class of so called "nano-clays" or "clays". Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire to have a nanocomposite with low air permeability; especially a dynamically vulcanized elastomer nanocomposite such as used in the manufacture of tires.

The preparation of nanocomposites uses a number of methods to generate exfoliated clays. One of the most common methods relies upon the use of organically modified montmorillonite clays. Organoclays are typically produced through solution based ion-exchange reactions that replace sodium ions that exist on the surface of sodium montmorillonite with organic molecules such as alkyl or aryl ammonium compounds and typically known in the industry as swelling or exfoliating agents. See, e.g., U.S. Pat. No. 5,807,629, WO 02/100935, and WO 02/100936. Other background references include U.S. Pat. Nos. 5,576,373, 5,665,183, 5,807,629, 5,936,023, 6,121,361, WO 94/22680, WO 01/85831, and WO 04/058874. One of the deficiencies of this method is the limited thermal stability of the amines. A second is the lack of chemical bonding with the matrix, often leading to poor mechanical properties and increased hysteresis. A third is the negative impact of the released amines and degradation products have on the transport properties.

One method to improve the organoclay performance is to use functionalized polymers to treat the clay. This approach has been limited to materials that are soluble in water or to materials that can be incorporated into the polymerization reaction. This approach has been used to prepare nylon nanocomposites, using for example, oligomeric and monomeric caprolactam as the modifier. Polyolefin nanocomposites, such as polypropylene nanocomposites, have utilized maleic anhydride grafted polypropylenes to achieve some success in the formation of nanocomposites.

For example, it is known to utilize exfoliated-clay filled nylon as a high impact plastic matrix, such as disclosed in U.S. Pat. No. 6,060,549 to Li et al. In particular, Li et al. disclose a blend of a thermoplastic resin such as nylon and a copolymer of a $C_4$ to $C_7$ isoolefin and a para-methylstyrene and a para-(halomethylstyrene), the blend also including nylon containing exfoliated-clays that are used as a high impact material. Further, Japanese Unexamined Application P2000-160024 to Yuichi et al. discloses a thermoplastic elastomer composition which can be used as an air barrier. The nanocomposite in Yuichi et al. includes is a blend similar to that disclosed in Li et al.

Elastomeric nanocomposite innerliners and innertubes have also been formed using a complexing agent and a rubber, where the agent is a reactive rubber having positively charged groups and a layered silicate uniformly dispersed therein. See, for example, Kresge et al. U.S. Pat. Nos. 5,665,183 and 5,576,373. This approach to improving air barriers has limited usefulness due to the need for pre-formed positively charged reactive rubber components.

Nanocomposites have also been formed using non-ionic, brominated copolymers of isobutylene and para-methylstyrene, and blends of these copolymers with other polymers. See, for example, Elspass et al., U.S. Pat. Nos. 5,807,629, and 6,034,164. It has been found that the efficiency of clay exfoliation, as determined by the relative permeability reduction, is not as high as that achieved in routes involving ionic interaction.

As described above, these nanocomposites are made by mixing of elastomers and organoclays either at melt state or in solution; and, due to the hydrophobic nature of the polymer, the organoclays are typically modified to provide better interaction between the clays and the polymers. The modification process typically involves exchange of Na+ cations in the inorganic clay with organic modifiers such as tetra alkyl ammonium salts. The process is expensive and most modified clays are not exfoliated in polymers or in organic solvent.

Another reference of interest includes WO 98/03562.

There is a need for a method to produce a polymer/clay nanocomposite with improved exfoliation of the clay. There is also need for a less costly method to produce polymer/clay nanocomposites using inorganic clay without modification.

SUMMARY OF THE INVENTION

The present invention prepares a clay-polymer nanocomposite via an organic aqueous emulsion wherein the polymer is provided in the organic phase, and the clay is provided in the aqueous phase. The clay can be an inorganic clay free of organic modification. Nanocomposites of polymer and inorganic clay can be obtained, and the process for their preparation can be efficient and economical.

In one embodiment, the invention provides a process to produce a nanocomposite. The process can include mixing an aqueous slurry of clay with a solution of polymer in an organic solvent to form an emulsion comprising a polymer-clay nanocomposite, and recovering the nanocomposite from the emulsion. The slurry can include an inorganic clay. In another embodiment, the slurry can be essentially free of organoclay (modified clay). The polymer in solution can be a halogenated polymer. In another embodiment, the polymer can be a halogenated isobutylene polymer. The emulsion can include an emulsifier or a surfactant. The nanocomposite can be recovered by filtering the nanocomposite from at least one phase of the emulsion. In another embodiment, the nanocomposite can be recovered by precipitation with an antisolvent. In another embodiment, the nanocomposite can be recovered by evaporating liquid from at least one phase of the emulsion.

In another embodiment, the invention provides a process to produce a nanocomposite comprising the steps of slurrying inorganic clay in water; dissolving halogenated isobutylene polymer in an organic solvent to form a water-immiscible polymer solution; emulsifying the slurry with the polymer solution to form a polymer-clay nanocomposite; and recovering the nanocomposite. The emulsification can be in the presence of an emulsifier and/or a surfactant. The emulsifier can be selected from tertiary amines, diamines, polyamines, amine salts, quaternary ammonium compounds, alkyl ethoxylates, linear alcohol ethoxylates, alkyl glucosides, amide ethoxylates, amine ethoxylates, alkyl amine ethoxylates such as coco amine ethoxylates, tallow amine ethoxylates, and oleyl amine ethoxylates or the like, phenol ethoxylates, alkyl phenol ethoxylates such as nonyl phenol ethoxylates, and the like, or mixtures thereof.

The polymer solution further can include a polymer chain E comprising an ammonium-functionalized group. The ammonium functionalized group can be described by the following group pendant to the polymer chain E:

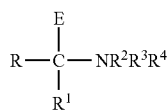

wherein R and R' are the same or different and are selected from hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions. In certain embodiments, at least one of $R^2$, $R^3$ and $R^4$ include a $C_1$ to $C_{20}$ aliphatic alcohol, ether, or carboxylic acid, such as, for example, where the ammonium functionalized group can be N-methyldiethanolamine, N,N-dimethylethanolamine, triethanolamine, or combinations thereof.

The inorganic clay can be a silicate. The silicate can be a smectite clay, such as montmorillonite, nontronite, beidellite, bentonite, volkonskoite, laponite, hectorite, saponite, sauconite, magadite, kenyaite, stevensite, vermiculite, halloysite, hydrotalcite, and so on, or a combination thereof.

The isobutylene polymer can include an interpolymer of a C4-C7 isoolefin and an alkylstyrene. The alkylstyrene can be para-methylstyrene. The isoolefin can be isobutylene. Alternately, the isobutylene polymer can include an interpolymer of a C4-C7 isoolefin (preferably isobutylene) and isoprene. The isobutylene polymer can include functional groups selected from halides, ethers, amines, amides, esters, acids, hydroxyls, and the like. The isobutylene polymer can be halogenated with bromine or chlorine.

The solvent used to form the polymer solution can be alkanes, alkenes, aromatics, nitrated alkanes, halogenated alkanes, and mixtures thereof. The polymer solution can include from 1 to 30 weight percent isobutylene polymer in one embodiment, and from 10 to 25 weight percent of isobutylene polymer in other embodiments.

The aqueous slurry of clay can comprise from 0.1 to 10 weight percent clay in one embodiment, and from 0.3 to 3.0 weight percent clay in other embodiments. The pH of the water in the slurry can be between 4 and 13.

The emulsion can be formed where the volume ratio of slurry to polymer solution is from 0.01:1 to 1:1 in one embodiment, and from 0.1:1 to 0.9:1 or from 0.3:1 to 0.7:1 in other embodiments.

The present invention also provides, in one embodiment, a nanocomposite prepared by the processes described herein. In another embodiment, the invention provides a nanocomposite comprising an isobutylene polymer having inorganic clay nanoparticles dispersed therein. The nanocomposite of the present invention can be useful in articles such as an innerliner or an innertube.

DETAILED DESCRIPTION

Figure 1:
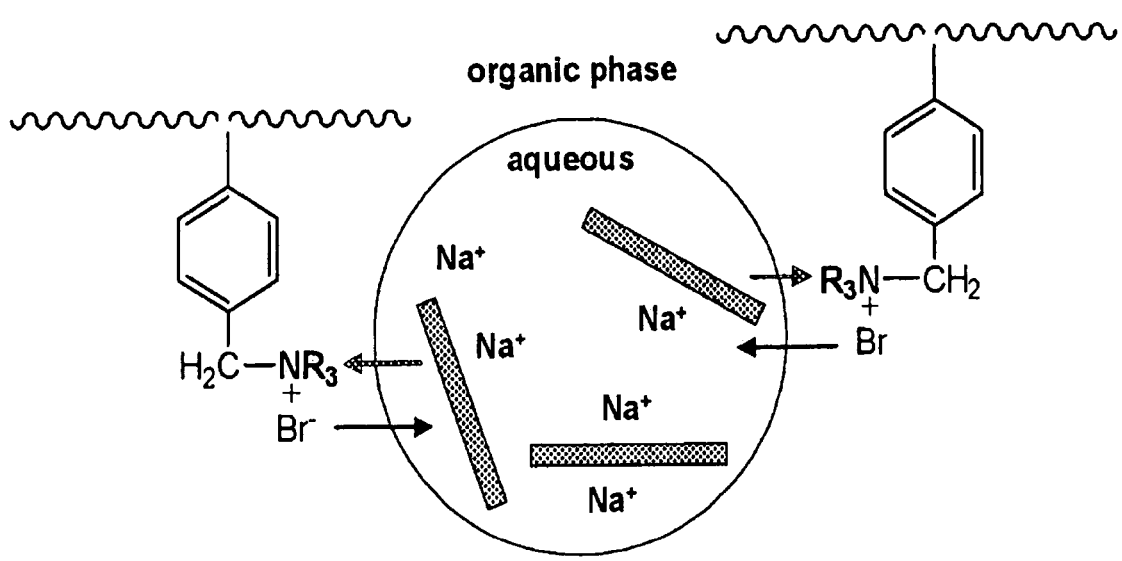
FIG. 1 illustrates an emulsion formed during one embodiment of the process of the present invention.

This invention describes a method of making polymer/clay nanocomposites using inorganic clay without modification. Clay is exfoliated when in aqueous solution. Without wishing to be bound by theory, it is believed that by contacting an aqueous clay solution with an organic solution of polymers or functionalized polymers in micro-emulsions, the interaction between the exfoliated clay and polymers provides a driving force to keep the clay exfoliated when incorporated into a polymer matrix. An emulsifier or surfactant can also be used to enhance the dispersion and formation of the micro-emulsions. The process of the present invention enhances the exfoliation of clays and results in nanocomposites with further improved barrier properties. The resulting nanocomposites can be used as a master batch in blends with other polymers or elastomers.

Definitions

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is understood by one of ordinary skill in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber."

As used herein, "phr" is 'parts per hundred rubber' and is a measure common in the art wherein components of a composition are measured relative to a major elastomer component, based upon 100 parts by weight of the elastomer(s) or rubber(s).

As used herein, "isobutylene based elastomer" or "isobutylene based polymer" refers to elastomers or polymers comprising at least 70 mole percent repeat units from isobutylene.

As used herein, isoolefin refers to any olefin monomer having at least one carbon having two substitutions on that carbon.

As used herein, "multiolefin" refers to any monomer having two or more unsaturations (typically double bonds), for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a polymer is present between the layers of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "exfoliation" refers to the separation of individual layers of the original inorganic particle, so that polymer can surround or surrounds each particle. In an embodiment, sufficient polymer is present between the platelets such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "suspension" refers to a system consisting of a solid dispersed in a solid, liquid, or gas usually in particles of larger than colloidal size.

As used herein, "emulsion" refers to a system consisting of a liquid or liquid suspension dispersed with or without an emulsifier in an immiscible liquid usually in droplets of larger than colloidal size.

As used herein, "hydrocarbon" refers to molecules or segments of molecules containing primarily hydrogen and carbon atoms. In some embodiments, hydrocarbon also includes halogenated versions of hydrocarbons and versions containing herteroatoms as discussed in more detail below.

Halogenated Elastomer

The nanocomposite of the present invention includes at least one halogenated elastomer comprising $C_4$ to $C_7$ isoolefin derived units. The isoolefin may be a $C_4$ to $C_8$ compound, in one embodiment selected from isobutylene, isobutene, 2-methyl-1-butene, 3-methyl-1-butene, 2-methyl-2-butene, and 4-methyl-1-pentene. The elastomer may also include other monomer derived units. In one embodiment, the halogenated elastomer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. In another embodiment, the elastomer includes at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-falvene, hexadiene, cyclopentadiene, methylcyclopentadiene, and piperylene.

In one embodiment, the halogenated elastomer includes an isoolefin derived unit, a multiolefin derived unit, and a styrenic derived unit. In another embodiment, the halogenated elastomer includes an isoolefin derived unit and a styrenic derived unit, and in yet another embodiment the halogenated elastomer includes an isoolefin derived unit and a multiolefin derived unit.

The halogenated elastomers in one embodiment of the invention are random elastomeric copolymers of a $C_4$ to $C_7$ isoolefin, such as isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. In another embodiment of the invention, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

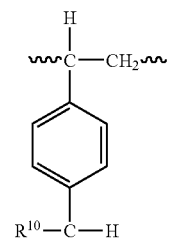

(4)

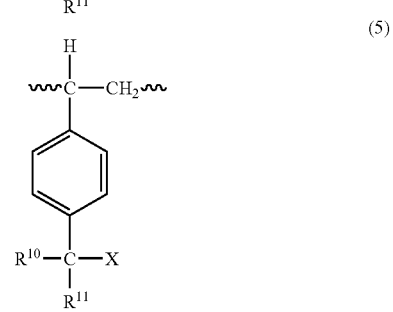

(5)

wherein $R^{10}$ and $R^{11}$ are independently hydrogen, lower alkyl, preferably $C_1$ to $C_7$ alkyl and primary or secondary alkyl halides and X is a functional group such as halogen. Preferably $R^{10}$ and $R^{11}$ are hydrogen. Up to 60 mole percent of the para-substituted styrene present in the interpolymer structure may be the functionalized structure (5) above in one embodiment, and in another embodiment from 0.1 to 5 mole percent. In yet another embodiment, the amount of functionalized structure (5) is from 0.4 to 1 mole percent.

The functional group X may be halogen or a combination of a halogen and some other functional group which may be incorporated by nucleophilic substitution of benzylic halogen with other groups such as carboxylic acids; carboxy salts;

carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines as described below.

Most useful of such functionalized materials are elastomeric random interpolymers of isobutylene and para-methylstyrene containing from 0.5 to 20 mole percent para-methylstyrene, wherein up to 60 mole percent of the methyl substituent groups present on the benzyl ring contain a bromine or chlorine atom, preferably a bromine atom (para(bromomethylstyrene)), as well as a combination of para(bromomethylstyrene) and other functional groups such as ester and ether. These halogenated elastomers are commercially available as EXXPRO™ Elastomers (ExxonMobil Chemical Company, Houston Tex.), and abbreviated as "BIMS".

In a preferred embodiment, the functionality is selected such that it can react or form polar bonds with functional groups present in the matrix polymer, for example, acid, amino or hydroxyl functional groups, when the polymer components are mixed at high temperatures.

These functionalized interpolymers have a substantially homogeneous compositional distribution such that at least 95% by weight of the polymer has a para-alkylstyrene content within 10% of the average para-alkylstyrene content of the polymer, as measured by the procedure described in U.S. Pat. No. 5,162,445. Desirable interpolymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The BIMS polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMS polymers are brominated polymers that generally contain from 0.1 to 5 mole percent of bromomethylstyrene groups relative to the total amount of monomer derived units in the polymer. In another embodiment, the amount of bromomethyl groups is from 0.2 to 3.0 mole percent, and from 0.3 to 2.8 mole percent in yet another embodiment, and from 0.4 to 2.5 mole percent in yet another embodiment, and from 0.3 to 2.0 in yet another embodiment, wherein a desirable range may be any combination of any upper limit with any lower limit. Expressed another way, preferred copolymers contain from 0.2 to 10 weight percent of bromine, based on the weight of the polymer, from 0.4 to 6 weight percent bromine in another embodiment, and from 0.6 to 5.6 weight percent in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mole percent based on the total number of para-methylstyrene, and wherein the para-methylstyrene derived units are present from 3 weight percent to 15 weight percent based on the total weight of the polymer in one embodiment, and from 4 weight percent to 10 weight percent in another embodiment. In another embodiment, the para-(halomethylstyrene) is para-(bromomethylstyrene).

The halogenated elastomer useful in the present invention may also include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of a $C_4$ to $C_7$ isoolefin and a multiolefin. In another embodiment, the halogenated rubber component is a blend of a polydiene or block copolymer, and a copolymer of a $C_4$ to $C_7$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. Nos. 4,074,035 and 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

More particularly, in one embodiment of the brominated rubber component of the invention, a halogenated butyl rubber is used. The halogenated butyl rubber is produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared by reacting a comonomer mixture, the mixture having at least (1) a $C_4$ to $C_7$ isoolefin monomer component such as isobutylene with (2) a multiolefin, or conjugated diene, monomer component. The isoolefin is in a range from 70 to 99.5 weight percent by weight of the total comonomer mixture in one embodiment, and 85 to 99.5 weight percent in another embodiment. The conjugated diene component in one embodiment is present in the comonomer mixture from 30 to 0.5 weight percent in one embodiment, and from 15 to 0.5 weight percent in another embodiment. In yet another embodiment, from 8 to 0.5 weight percent of the comonomer mixture is conjugated diene.

The isoolefin is a $C_4$ to $C_6$ compound such as isobutylene, isobutene 2-methyl-1-butene, 3-methyl-1-butene, 2-methyl- 2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 weight percent of isobutylene with 0.5 to 8 weight percent isoprene, or reacting 95 to 99.5 weight percent isobutylene with from 0.5 to 5.0 weight percent isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen content is from 0.1 to 10 weight percent based in on the weight of the halogenated butyl rubber in one embodiment, and from 0.5 to 5 weight percent in another embodiment. In yet another embodiment, the halogen weight percent of the halogenated butyl rubber is from 1 to 2.2 weight percent.

In another embodiment, the halogenated butyl or star-branched butyl rubber may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. Nos. 4,632,963; 4,649,178; 4,703,091. Thus, in one embodiment of the invention, the halogenated butyl rubber is such that the halogenated multiolefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described as follows (6), wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment:

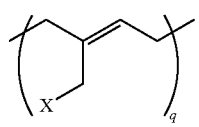

(6)

A commercial embodiment of a halogenated butyl rubber useful in the present invention is Bromobutyl 2222 (Exxon-Mobil Chemical Company). Its Mooney Viscosity is from 27 to 37 (ML 1+8 at 125° C., ASTM 1646, modified), and the bromine content is from 1.8 to 2.2 weight percent relative to the Bromobutyl 2222. Further, cure characteristics of Bromobutyl 2222 are as follows: MH is from 28 to 40 dN·m, ML is from 7 to 18 dN·m (ASTM D2084, modified). Another commercial embodiment of a halogenated butyl rubber useful in the present invention is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 weight percent. Further, cure characteristics of Bromobutyl 2255 are as follows: MH is from 34 to 48 dN·m, ML is from 11 to 21 dN·m (ASTM D2084, modified). The invention is not limited to the commercial source of any of the halogenated rubber components.

In another embodiment of the brominated rubber component of the invention, a branched or "star-branched" halogenated butyl rubber is used. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer weight percent, greater than 0.3 weight percent in one embodiment, and from 0.3 to 3 weight percent in another embodiment, and from 0.4 to 2.7 weight percent in yet another embodiment.

A commercial embodiment of an SBHR useful in the present invention is Bromobutyl 6222 (ExxonMobil Chemical Company), having a Mooney Viscosity (ML 1+8 at 125° C., ASTM 1646, modified) of from 27 to 37, and a bromine content of from 2.2 to 2.6 weight percent relative to the SBHR. Further, cure characteristics of Bromobutyl 6222 are as follows: MH is from 24 to 38 dN·m, ML is from 6 to 16 dN·m (ASTM D2084, modified).

The halogenated rubber component is present in the blend of the invention from 10 to 90 phr in one embodiment, from 20 to 80 phr in another embodiment, and from 30 to 70 phr in yet another embodiment, wherein a desirable range may be any combination of any upper phr limit with any lower phr limit.

Amine Functionalized Halogenated Elastomers

The halogen in the above described halogenated polymer can react or form polar bonds with functional groups present in the matrix polymer, for example, acid, amino or hydroxyl functional groups, when the components are mixed at high temperatures. One embodiment of the present invention is a nanocomposite comprising a clay and a halogenated elastomer comprising $C_4$ to $C_7$ isoolefin derived units; wherein a portion of the halogen in the elastomer is electrophilically substituted with an amine-functionalized group such that the halogenated elastomer also comprises an amine-functionalized monomer unit described by the following group pendant to the elastomer E:

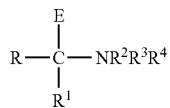

wherein R and $R^1$ are the same or different and are selected from hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions. In a desirable embodiment, at least one of $R^2$, $R^3$ and $R^4$ are selected from $C_1$ to $C_{20}$ alkenes, $C_1$ to $C_{20}$ aliphatic alcohols, $C_1$ to $C_{20}$ aliphatic ethers, $C_1$ to $C_{20}$ carboxylic acids, nitriles, ethoxylated amines, acrylates, esters and ammonium ions. In another embodiment, $R^2$, $R^3$ and $R^4$ are the same or different and are selected from $C_1$ to $C_{20}$ alkyl, $C_1$ to $C_{20}$ ethoxy, or polyethoxy.

In one embodiment, the halogenated elastomer E comprises $C_4$ to $C_7$ isoolefin derived units, para-methylstyrene derived units and para-(halomethylstyrene) derived units.

In another embodiment, the halogenated elastomer E comprises $C_4$ to $C_7$ isoolefin derived units, multiolefin derived units, and halogenated multiolefin derived units.

The functional group pendant to the elastomer E can be further described as functionalized amine, wherein at least one of $R^2$, $R^3$ and $R^4$ is selected from $C_1$ to $C_{20}$ aliphatic alcohols or ethers, $C_1$ to $C_{20}$ carboxylic acids, nitriles, esters, ammonium ions, or acrylate groups; wherein the acrylate is described by the following formula:

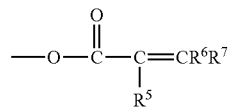

wherein $R^5$, $R^6$ and $R^7$ are the same or different and are selected from hydrogen and $C_1$ to $C_7$ alkyl or alkenyl.

In another embodiment, the amine-functionalized group is selected from ethoxylated amines (or the corresponding ammonium ion) having the following structure:

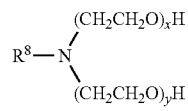

wherein $R^8$ is a $C_1$ to $C_{20}$ alkyl; and wherein x+y is a number from 2 to 50, preferably x+y is 2, 5, 10, 15, or 50.

In another embodiment, the amine-functionalized group is selected from dimethylaminoethylacrylate, dimethylaminomethylacrylate, N-methylamino-bis-2-propanol, N-ethylamino-bis-2-propanol, dimethylaminoethylmethacrylate, diethylaminopropanol, diethylethanolamine, dimethylamino-1-propanol, tripropanolamine, triethanolamine, aminolauric acid, betaine, and combinations thereof.

The amine-functionalized derived unit may be present on the halogenated elastomer at from 0.01 weight percent to 10 weight percent of the elastomer in one embodiment, and from 0.1 weight percent to 8 weight percent in another embodiment, and from 0.2 to 6 weight percent in yet another embodiment, wherein a desirable range may be any combination of any upper weight percent limit with any lower weight percent limit.

The polymer component of the nanocomposites of the present invention may comprise at least one elastomer as described in any of the above elastomers or may comprise any combination of at least two or more of the elastomers described above. In an embodiment, the elastomer comprises at least one isobutylene-based polymer. In another embodiment, the elastomer comprises at least one isobutylene-based polymer and at least one other rubber. In yet another embodiment, the elastomer comprises at least two or more isobutylene-based polymers.

Secondary Rubber Component

A secondary rubber or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "high cis-polybutadiene", it is meant that 1,4-cis polybutadiene is used, wherein the amount of cis component is at least 95%. An example of a high cis-polybutadiene commercial product useful herein is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECH- NOLOGY 260-283 (1995). Suitable ethylene-propylene rubbers are commercially available under the VISTALON™ tradename (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In one embodiment of the invention, a so called semi-crystalline copolymer ("SCC") is present as the secondary "rubber" component. Useful Semi-crystalline copolymers are described in WO00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Fillers, Additives, and Curatives

The composition of the invention may also include one or more filler components such as calcium carbonate, clay, mica, silica and silicates, talc, titanium dioxide, and carbon black. As used herein, fillers do not include inorganic particles forming part of the nanocomposite matrix, e.g. clay particles having a dimension in the nanometer range, but larger clay particles can be used as a filler in the nanocomposites, if desired. In one embodiment, the filler is carbon black or modified carbon black. A preferred filler is semi-reinforcing grade carbon black present at a level of from 10 to 150 phr of the blend, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the nanocomposite.

The composition of this invention may be extruded, compression molded, blow molded or injection molded into various shaped articles including fibers, films, industrial parts such as automotive parts, appliance housings, consumer products, packaging and the like. The resulting articles can exhibit both high impact strength and low vapor permeability. In particular, the composition described herein is useful for air barriers such as bladders, and automotive (including truck, commercial and/or passenger) or aircraft innerliners and innertubes.

Clays

The nanocomposites of the present invention can include swellable inorganic clay. Swellable layered inorganic clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 5 to 20 Å, preferably 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay can be exfoliated by suspending the clay in a water solution. Preferably, the concentration of clay in water is sufficiently low to minimize the interaction between clay particles and to fully exfoliate the clay. In one embodiment, the aqueous slurry of clay can have a clay concentration of between 0.1 and 5.0 weight percent; between 0.1 and 3.0 weight percent in other embodiments.

The amount of clay or exfoliated clay incorporated in the nanocomposites in accordance with this invention is sufficient to develop an improvement in the mechanical properties or barrier properties of the nanocomposite, for example, tensile strength or oxygen permeability. Amounts of clay in the nanocomposite generally range from 0.5 to 10 weight percent in one embodiment, and from 1 to 5 weight percent in another embodiment, based on the polymer content of the nanocomposite. Expressed in parts per hundred rubber, the clay or exfoliated clay may be present from 1 to 30 phr in one embodiment, from 2 to 20 phr in another embodiment, and from 3 to 10 phr in another embodiment.

Nanocomposite Processing

The nanocomposites of the present invention can be produced by emulsion processes. In one embodiment, the process can comprise mixing an aqueous slurry of inorganic clay with a polymer solution (cement). The mixing should be sufficiently vigorous to form emulsions or micro-emulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered clay with Solution B comprising a solvent and at least one elastomer; and removing the solvent and water from the contact product of Solution A and Solution B to recover a nanocomposite.

In some embodiments, a nanocomposite is produced by a process comprising contacting Solution A comprising water and at least one layered clay with Solution B comprising a solvent and at least one elastomer, wherein the contacting is performed in the presence of an emulsifier or surfactant.

The emulsions of the present invention are formed by conventional emulsion technology, that is, subjecting a mixture of the hydrocarbon, water and surfactant, when used, to sufficient shearing, as in a commercial blender or its equivalent for a period of time sufficient for forming the emulsion, e.g., generally at least a few seconds. For general emulsion information, see generally, "Colloidal Systems and Interfaces", S. Ross and I. D. Morrison, J. W. Wiley, NY, 1988. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

In certain embodiments, the emulsion is formed by subjecting the mixture to agitation using a high-shear mixer.

When used, the surfactant concentration is sufficient to allow the formation of a relatively stable emulsion. Preferably, the amount of surfactant employed is at least 0.001 weight percent of the total emulsion, more preferably about 0.001 to about 3 weight percent, and most preferably 0.01 to less than 2 weight percent.

Cationic surfactants useful in preparing the emulsions of this invention include tertiary amines, diamines, polyamines, amine salts, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

In other embodiments, a nanocomposite is produced by a process comprising mixing an aqueous slurry of inorganic clay with a polymer solution wherein the polymer comprises amine-functionalized monomer unit described by the following:

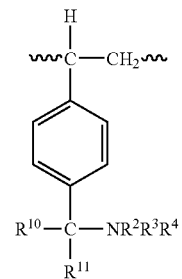

wherein $R^{10}$ and $R^{11}$ are the same or different and are one of hydrogen, a $C_1$ to $C_7$ alkyl, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions. The functional groups and optional components are as described above in the indicated amounts.

In one embodiment, the elastomer and functionalized amine are combined in a first step, followed by emulsification with an aqueous slurry comprising at least one clay.

In certain embodiments, at least one of $R^2$, $R^3$ and $R^4$ can be a $C_1$ to $C_{20}$ aliphatic alcohol or ether. In these embodiments, the amine functionalized polymer can act as a self-emulsifier, negating or minimizing the need for additional surfactant or emulsifier to form a stable emulsion. The amine-functionalized polymer can enhance the extraction of the clay from the aqueous phase and promote exfoliation of the clay. In certain embodiments, the functional group can be N-methyldiethanolamine, N,N-dimethylethanolamine, triethanolamine, or combinations thereof. By contacting an aqueous clay slurry with organic solution of functionalized polymers in micro-emulsions, the interaction between the exfoliated clay and polymers, especially functionalized ionic polymers, provides a driving force to keep the clay exfoliated in the polymer matrix (as illustrated in FIG. 1), enhancing the exfoliation of the clays and resulting in nanocomposites with improved barrier properties.

The nanocomposite formed in the emulsion process can be recovered by processes such as, for example, by precipitating the polymer from solution, recovering the precipitated polymer/clay nanocomposite from the solvent, antisolvent, and water, and drying the recovered nanocomposite. Alternatively, the organic solvent can be vaporized with steam and the resulting polymer slurry passed through a series of extruders to dry the nanocomposite. Other processes to recover the nanocomposite can also be used; the scope of the present invention is not limited to any particular recovery processes.

The final composition is formable and curable into such articles as air barriers, in particular, innertubes and innerliners.

Suitable solvents used to form the polymer solution are fully described in WO 02/100935 and WO 02/100936. Preferably the solvent comprises one or more alkanes, alkenes, aromatics, nitrated alkanes, halogenated alkanes, or mixtures thereof. Preferably the solvent comprises one or more C2 to C40 linear branched or cyclic alkanes. Preferably the solvent comprises one or more of hexane, cyclohexane, toluene, tetrahydrofuran, butane, isobutene, pentane, octane isooctane, nonane dodecane or mixtures thereof.

In the embodiments described above, solvents may be present in the production of the nanocomposite composition from 30 to 99 weight percent, alternatively from 40 to 99 weight percent, alternatively from 50 to 99 weight percent, alternatively from 60 to 99 weight percent, alternatively from 70 to 99 weight percent, alternatively from 80 to 99 weight percent, alternatively from 90 to 99 weight percent, alternatively from 95 to 99 weight percent, alternatively from 70 to 90 weight percent, alternatively from 75 to 90 weight percent, based upon the total weight of the polymer solution.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

The aqueous slurry of clay and water can be prepared by stirring clay and water at room temperature for a time sufficient to exfoliate the clay. In one embodiment, the clay and water can be stirred for between 0.25 and 24 hours. The clay and water can be stirred for between 4 and 16 hours, or between 10 and 14 hours, in other embodiments.

In certain embodiments, when the aqueous slurry of clay is prepared, the clay can comprise from 0.01 to 40 weight percent of the aqueous slurry, alternatively from 0.1 to 5.0 weight percent, alternatively from 0.3 to 3.0 weight percent, based upon the total weight of the slurry.

In certain embodiments, the volume ratio of the aqueous slurry of clay to the polymer solution in the emulsion can be from 0.01:1 to 1:1; alternatively from 0.1:1 to 0.9:1; alternatively from 0.3:1 to 0.7:1.

In certain embodiments, the pH of the aqueous slurry of clay can be acidic, neutral, or basic. In one embodiment, the pH of the aqueous slurry of clay can be between 4 and 13.

In still another embodiment, the invention provides for a process to improve the air impermeability of an elastomer comprising contacting at least one elastomer solution, and at least one aqueous slurry comprising an unmodified layered filler (such as inorganic clay for one example) to form a nanocomposite, wherein the oxygen transmission rate of the nanocomposite is 150 mm·cc/[m$^2$·day] at 40° C. or lower as measured on cured nanocomposite compositions or articles as described herein.

Alternatively, the oxygen transmission rate is 150 mm·cc/[m$^2$·day] at 40° C. or lower as measured on cured nanocomposite compounds as described herein; the oxygen transmission rate is 140 mm·cc/[m$^2$·day] at 40° C. or lower as measured on cured nanocomposite compounds as described herein; the oxygen transmission rate is 130 mm·cc/[m$^2$·day] at 40° C. or lower as measured on cured nanocomposite compounds as described herein; the oxygen transmission rate is 120 mm·cc/[m2·day] at 40° C. or lower as measured on cured nanocomposite compounds as described herein; the oxygen transmission rate is 110 mm·cc/[m$^2$·day] at 40° C. or lower as measured on cured nanocomposite compounds as described herein; the oxygen transmission rate is 100 mm·cc/[m$^2$·day] at 40° C. or lower as measured on cured nanocomposite compounds as described herein; or the oxygen transmission rate is 90 mm·cc/[m$^2$·day] at 40° C. or lower as measured on cured nanocomposite compounds as described herein.

Integrated Halogenation of Butyl Rubbers and Nanocomposite Processing

Figure 2:
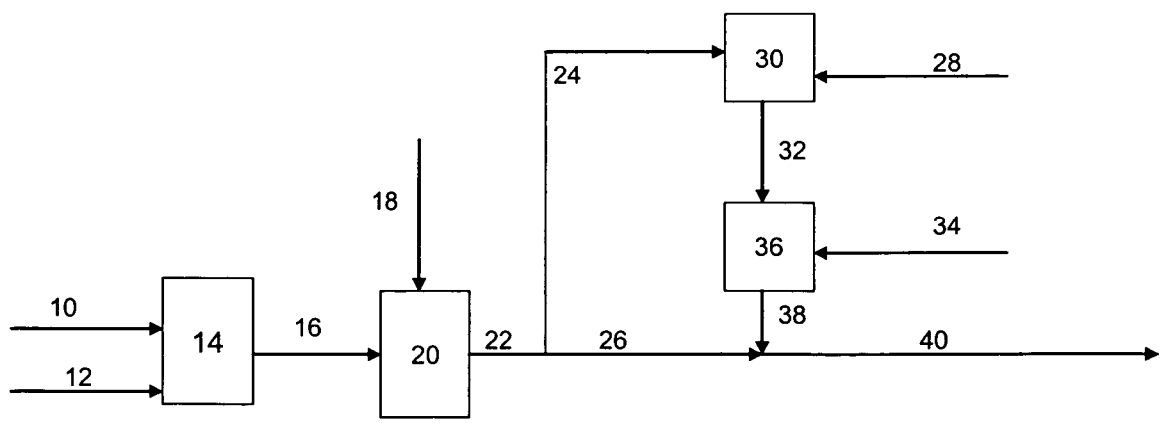
FIG. 2 illustrates a simplified flow diagram of a butyl rubber halogenation process incorporating an embodiment of the nanocomposite process of the present invention.

In forming the nanocomposite by the process above, the ionic functionality in the polymer exhibits strong ionic interactions, and thus the amount of functionality that may be introduced is limited. A high degree of functionality could lead to gel formation and to unprocessable polymer. The process as illustrated in FIG. 2 and described herein can maximize intercalation and exfoliation of the clay in a polymer product. A solution 10 of rubber in hexane or other solvent is contacted with halogen 12 under vigorous mixing in a halogenation reactor 14, producing reactor effluent stream 16. The halogenated rubber solution 16 is then neutralized with aqueous caustic 18 in vessel 20. The halogenation of butyl rubbers is described in detail in U.S. Pat. Nos. 4,074,035, 5,071,913, 5,286,804, 5,182,333 and 6,228,978, and in RUBBER TECHNOLOGY, 298-300 (Maurice Morton ed., Chapman & Hall 1995).

The neutralized halogenated rubber stream 22 can be divided into two portions 24, 26. Halogenated rubber portion 24 is reacted with functionalizing agent 28 in vessel 30. The rubber can be functionalized with an amine, for example, as described above. Because a high degree of functionality in the finished product is not desirable, stream 24 can be from 1 to 30% of stream 22; alternatively, stream 24 can be from 5 to 20% of stream 22; alternatively from 8 to 15% of stream 22.

The functionalized rubber effluent 32 from vessel 30 can be emulsified with aqueous inorganic clay slurry 34 in pump or vessel 36, as described above, forming the nanocomposite of the present invention which can be recovered from vessel 36 in stream 38. The nanocomposite stream 38 can then be combined with halogenated rubber portion 26.

The combined stream 40 can be processed to separate the nanocomposite mixture from the solvents and water. As one example, the hexane in stream 40 can be vaporized with steam, and the hexane can be recovered and recycled. The rubber in water slurry can then be finished in a series of extruders and the dried rubber baled.

In a preferred embodiment, the processes described herein produce a nanocomposite comprising: 1) an isobutylene polymer which comprises one or more functional groups selected from the group consisting of ethers, amines, amides, esters, acids, and hydroxyls; and 2) inorganic clay nanoparticles of less than 20 nanometers average thickness (preferably less than 10 nanometers, preferably less than 5 nanometers, preferably less than 3 nanometers as measured by Transmission Electron Microscopy) uniformly dispersed therein. By uniformly dispersed therein is meant that the particles are not agglomerated, preferably that at least 80% of the particles are surrounded by isobutylene polymer, preferably at least 90%, preferably at least 95%, preferably 100% are surrounded by isobutylene as shown on TEM.

In an alternate embodiment, this invention relates to:

1. A process to produce a nanocomposite comprising the steps of: 1) mixing an aqueous slurry of clay with a solution of polymer in an organic solvent to form an emulsion comprising a polymer-clay nanocomposite; and 2) recovering the nanocomposite from the emulsion.
2. The process of paragraph 1 wherein the slurry comprises inorganic clay.
3. The process of paragraph 1 or 2 wherein the slurry is essentially free of organoclay.
4. The process of paragraph 1, 2 or 3 wherein the polymer solution comprises halogenated polymer.
5. The process of any of paragraphs 1 to 4 wherein the polymer comprises halogenated isobutylene polymer.
6. The process of any of paragraphs 1 to 5 wherein the emulsion includes an emulsifier.
7. The process of any of paragraphs 1 to 6 wherein the recovery comprises filtering the nanocomposite from at least one phase of the emulsion.
8. The process of any of paragraphs 1 to 7 wherein the recovery comprises precipitating the nanocomposite with an antisolvent.
9. The process of any of paragraphs 1 to 8 wherein the recovery comprises evaporating liquid from at least one phase of the emulsion.
10. A process to produce a nanocomposite comprising the steps of:
   slurrying inorganic clay in water to form an aqueous slurry;
   dissolving halogenated isobutylene polymer in an organic solvent to form a water-immiscible polymer solution;
   emulsifying the slurry with the polymer solution to form a polymer-clay nanocomposite;
   recovering the nanocomposite.
11. The process of paragraph 10 wherein the emulsification is in the presence of an emulsifier.
12. The process of paragraph 10 wherein the polymer solution further comprises a polymer chain E comprising an ammonium-functionalized group.
13. The process of paragraph 11 wherein the polymer solution further comprises a polymer chain E comprising an ammonium-functionalized group.
14. The process of paragraph 12 or paragraph 13 wherein the ammonium functionalized group is described by the following group pendant to the polymer chain E:

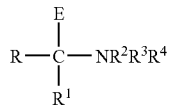

wherein R and $R^1$ are the same or different and are one of a hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions.

15. The process of paragraph 14 wherein the ammonium functionalized group is selected from the group consisting of N-methyldiethanolamine, N,N-dimethylethanolamine, triethanolamine, or combinations thereof.
16. The process of paragraph 11 wherein the emulsifier is selected from the group consisting of tertiary amines, diamines, polyamines, amine salts, quaternary ammonium compounds, alkyl glucosides, and ethoxylates.
17. The process of paragraph 11 wherein the emulsifier comprises alkyl ethoxylate, linear alcohol ethoxylate, amide ethoxylate, amine ethoxylate, or phenol or alkyl phenol ethoxylate.
18. The process of paragraph 11 wherein the emulsifier comprises coco amine ethoxylate, tallow amine ethoxylate, oleyl amine ethoxylate, or nonyl phenol ethoxylate.
19. The process of any of paragraphs 10 to 18 wherein the inorganic clay comprises silicate.
20. The process of paragraph 19 wherein the silicate comprises smectite clay.
21. The process of paragraph 20 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.
22. The process of paragraph 20 wherein the smectite clay comprses montmorillonite, bentonite, vermiculite, or a combination thereof.
23. The process of any of paragraphs 10 to 22 wherein the polymer comprises isobutylene polymer.
24. The process of paragraph 23 wherein the isobutylene polymer comprises an interpolymer of a C4-C7 isoolefin and an alkylstyrene.
25. The process of paragraph 24 wherein the alkylstyrene comprises para-methylstyrene.
26. The process of paragraph 25 wherein the isoolefin comprises isobutylene.
27. The process of paragraph 25 wherein the isobutylene polymer comprises functional groups selected from the group consisting of halides, ethers, amines, amides, esters, acids, and hydroxyls.
28. The process of paragraph 25 wherein the isobutylene polymer is halogenated with bromine or chlorine.
29. The process of any of paragraphs 10 to 28 wherein the solvent comprises alkanes, alkenes, aromatics, nitrated alkanes, halogenated alkanes, or mixtures thereof.
30. The process of any of paragraphs 10 to 29 wherein the isobutylene polymer comprises from 1 to 30 weight percent of the polymer solution.
31. The process of any of paragraphs 10 to 29 wherein the isobutylene polymer comprises from 10 to 25 weight percent of the polymer solution.
32. The process of any of paragraphs 10 to 31 wherein the inorganic clay comprises from 0.1 to 10 weight percent of the aqueous slurry of clay.
33. The process of paragraph 32 wherein the inorganic clay comprises from 0.3 to 3 weight percent of the aqueous slurry of clay.
34. The process of any of paragraphs 10 to 33 wherein the pH of the aqueous slurry is between 4 and 13.
35. The process of any of paragraphs 10 to 34 wherein the volume ratio of slurry to polymer solution in step (c) is from 0.01:1 to 1:1.
36. The process of paragraph 35 wherein the volume ratio of slurry to polymer solution in step (c) is from 0.1:1 to 0.9:1.
37. The process of paragraph 35 wherein the volume ratio of slurry to polymer solution in step (c) is from 0.3:1 to 0.7:1.
38. The process of paragraph any of paragraphs 10 to 37 wherein the recovery comprises filtering the nanocomposite from at least one phase of the emulsion.

39. The process of any of paragraphs 10 to 38 wherein the recovery comprises precipitating the nanocomposite with an antisolvent.
40. The process of any of paragraphs 10 to 39 wherein the recovery comprises evaporating liquid from at least one phase of the emulsion.
41. A nanocomposite produced by any of paragraphs 1 to 39 above comprising:
   an isobutylene polymer which comprises one or more functional groups selected from the group consisting of ethers, amines, amides, esters, acids, and hydroxyls;
   inorganic clay nanoparticles of less than 20 nanometers average thickness uniformly dispersed therein.
42. The nanocomposite of paragraph 41 wherein the isobutylene polymer comprises an interpolymer of a C4-C7 isoolefin and an alkylstyrene.
43. The nanocomposite of paragraph 42 wherein the alkylstyrene comprises para-methylstyrene.
44. The nanocomposite of paragraph 42 wherein the isoolefin comprises isobutylene.
45. The nanocomposite of paragraph 41, 42, 43 or 44 wherein the isobutylene polymer comprises two or more functional groups selected from the group consisting of halides, ethers, amines, amides, esters, acids, and hydroxyls.
46. The nanocomposite of any of paragraphs 41 to 45 wherein the isobutylene polymer is halogenated with bromine or chlorine.
47. The nanocomposite of any of paragraphs 41 to 46 wherein the inorganic clay comprises a silicate.
48. The nanocomposite of any of paragraphs 41 to 46 wherein the inorganic clay comprises smectite clay.
49. The nanocomposite of paragraph 48 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.
50. The nanocomposite of paragraph 48 wherein the smectite clay comprses montmorillonite, bentonite, vermiculite, or a combination thereof.
51. A nanocomposite comprising the recovered polymer-clay nanocomposite made by the process of any one of paragraphs 1-40.
52. An innerliner comprising the nanocomposite of any one of paragraphs 41-50.
53. An innertube comprising the nanocomposite of any one of paragraphs 41-50.

The following non-limiting examples are illustrative of the present invention.

EXAMPLES

Permeability Testing

For each of the following examples, the nanocomposites formed were analyzed for permeability properties using the following method. In certain embodiments, 36 grams of the clay-rubber mixture were loaded into a Brabender® mixer at a temperature of 130-145° C. and mixed with 20 grams of carbon black (N660) for 7 minutes. The mixture was further mixed with a curatives package of 0.33 g stearic acid, 0.33 g of ZnO (Kadox 911 obtained from CP Hall, Chicago, Ill.), and 0.33 g MBTS at 40° C. and 40 rpm for 3 minutes. The resulting rubber compounds were milled, compression molded and cured at 170° C. All specimens were compression molded with slow cooling to provide defect-free pads. A compression and curing press was used for rubber samples. Typical thickness of a compression molded pad was around 15 mil (38.1 microns). Using an Arbor press, 2-in. (5 cm) diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 40° C. under the principle of R. A. Pasternak et al. in 8 JOURNAL OF POLYMER SCIENCE: PART A-2 467 (1970). Disks thus prepared were mounted on a template and sealed with vacuum grease. Ten psig (0.07 MPa(g)) nitrogen was kept on one side of the disk, whereas the other side was 10 psig (0.07 MPa(g)) oxygen. Using the oxygen sensor on the nitrogen side, the increase in oxygen concentration was monitored over time. The time required for oxygen to permeate through the disk, or for oxygen concentration on the nitrogen side to reach a constant value, was recorded and used to determine the oxygen permeability. Permeability was measured as oxygen transmission rate on a Mocon WX-TRAN 2/61 at 40° C. Where multiple samples were prepared using the same procedure, permeation rate results are given for each sample.

In certain embodiments, a useful formulation for property evaluation would be as follows:

| Material I.D. | Parts by Weight |
| --- | --- |
| Elastomer/Clay | 108.0 (100 parts of rubber and 8 parts of clay) |
| Carbon black N660 | 60.0 |
| Stearic Acid | 1.0 |
| ZnO Kadox 911 | 1.0 |
| MBTS | 1.0 |

Carbon black N660 can be obtained from, e.g., Cabot Corp. (Billerica, Mass.). Stearic acid, a cure agent, can be obtained from, e.g., C. K. Witco Corp. (Taft, La.), Kadox 911, a ZnO activator, can be obtained from C. P. Hall (Chicago, Ill.). MBTS, 2-mercaptobenzothiazole disulfide, can be obtained from R. T. Vanderbilt (Norwalk, Conn.) or Elastochem (Chardon, Ohio).

PIBS-Clay Nanocomposites

For Examples 1-10, a mixture of BIMS 03-1 (10 weight percent PMS, 0.8 mole percent Br) was dissolved in cyclohexane in a 2-liter reactor. The polymer cement was heated to a temperature between 60 and 80° C., after which an amine was added to the solution. An aqueous slurry of clay and water was prepared separately by stirring the clay and water at room temperature for 12 hours. The aqueous slurry of clay was then added to the polymer cement with vigorous mixing to give a stable emulsion. The emulsion was mixed in the reactor for a period of time, after which the product was precipitated by adding 2000 mL of isopropyl alcohol to the polymer/clay emulsion. The resulting polymer/clay nanocomposite was dried in a vacuum oven at 80° C. for 16 hours. The permeability of the dried nanocomposite was then tested as described above.

TABLE 1

Material Description for abbreviations in Examples.

| Designation | Description | Material/Supplier |
| --- | --- | --- |
| BIMS 03-1 | BIMS rubber (brominated copolymer of isobutylene and paramethylstyrene), 32 | Prepared according to general procedure described in |

TABLE 1-continued

Material Description for abbreviations in Examples.

| Designation | Description | Material/Supplier |
|---|---|---|
| | Mooney, 0.8 mol % Br, 10 wt % PMS | U.S. Pat. No. 5,162,445. |
| DMHA | N,N-dimethylhexyl amine | Aldrich |
| PIBA | Polyisobutyl amine | KEROCOM PIBA 03; BASF |
| PIBSA | Polyisobutylene succinic anhydride | PIBSA 48; INFINEUM, USA |
| DMHTD | dimethyl hydrogenated tallowalkyl amine | Armeen DMHTD; Akzo Nobel Chemical |
| Na+ | Un-modified (natural) Montmorillonite clay with Na counter ions | CLOISITE ® Na+; Southern Clay Products, Inc. |
| Na+ Slurry | Aqueous slurry of Montmorillonite clay with Na counter ions | CLOISITE ® Na+, 2.83 wt % slurry; Southern Clay Products, Inc. |
| ME-100 | Synthetic mica | SOMASIF ME-100; Co-op Chemical Co. Ltd. |
| Kenyaite | Layered silicate | Laboratory synthesized |

TABLE 2

Nanocomposites formed without emulsifier.

| | Polymer Cement | | | Aqueous Slurry | | | | | |
|---|---|---|---|---|---|---|---|---|---|
| | BIMS | | Reactor | Amine | | Inorganic | | | Permeability |
| Ex. | 03-1 (g) | Cyclohexane (mL) | Temp. (° C.) | Type | Amt (g) | Clay Type | Amt. (g) | Water (mL) | (mm · cc/m2 · day, 40° C.) |
| 1 | 50 | 600 | 70 | DMHTD | 0.5 | Na+ | 2.0 | 500 | 100.75; 96.06 |
| 2 | 50 | 600 | 70 | DMHTD | 0.5 | Na+ slurry | 106 | 400 | 97.73; 97.27 |
| 3 | 50 | 600 | 70 | DMHTD | 0.5 | Na+ | 4.0 | 500 | 94.62; 95.45 |
| 4 | 50 | 600 | 70 | DMHA | 0.125 | Na+ | 2.0 | 500 | 102.42; 102.18 |
| 5 | 100 | 1000 | 75 | PIBA | 2 | Na+ | 5.7 | 600 | 106.99; 103.45 |
| 6 | 100 | 1000 | 75 | DMHA | 0.25 | Na+ | 5.7 | 600 | 98.19; 99.37 |
| 7 | 100 | 1000 | 75 | DMHTD | 1.2 | ME-100 | 4.0 | 600 | 110.22; 108.07 |
| 8 | 100 | 1000 | 75 | DMHTD | 1.2 | ME-100 | 8.0 | 600 | 90.82; 92.49 |
| 9 | 100 | 1000 | 70 | PIBA | 1.5 | ME-100 | 8.0 | 600 | 107.7; 103.8 |
| 10 | 100 | 1000 | 75 | DMHTD | 1.0 | Kenyaite | 8.0 | 600 | 104.56; 103.67 |

Example 1

Fifty grams of BIMS 03-1 (10 weight percent PMS, 0.8 mole percent Br) were dissolved in 600 mL of cyclohexane in a 2-Liter reactor. The polymer cement was heated to 70° C., and 0.5 grams of dimethyl hydrogenated tallowalkyl amine (Armeen DMHTD from Akzo Nobel) were added. The reaction was kept at 70° C. for 3 hours. An aqueous slurry of CLOISITE® Na+ (2 g) and water (500 mL) was prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 2

Fifty grams of BIMS 03-1 (10 weight percent PMS, 0.8 mole percent Br) were dissolved in 600 mL of cyclohexane in a 2-Liter reactor. The polymer cement was heated to 70° C., and 0.5 grams of dimethyl hydrogenated tallowalkyl amine (Armeen DMHTD from Akzo Nobel) were added. The reaction was kept at 70° C. for 1 hour. An aqueous slurry of CLOISITE® Na+ (106 g of 2.83 wt % slurry from Southern Clay) and water (400 mL) was prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 3

Fifty grams of BIMS 03-1 (10 weight percent PMS, 0.8 mole percent Br) were dissolved in 600 mL of cyclohexane in a 2-Liter reactor. The polymer cement was heated to 70° C., and 0.5 grams of dimethyl hydrogenated tallowalkyl amine (Armeen DMHTD from Akzo Nobel) were added. The reaction was kept at 70° C. for 3 hours. An aqueous slurry of CLOISITE® Na+ (4 g) and water (500 mL) was prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 4

Fifty grams of BIMS 03-1 (10 wt % of PMS, 0.8 mol % Br) were dissolved in 600 mL of cyclohexane in a 2-Liter reactor. The polymer cement was heated to 70° C., and 0.125 grams of N,N-dimethylhexyl amine (Aldrich) were added. The reaction was kept at 70° C. for 2 hours. An aqueous slurry of CLOISITE® Na+ (2 g) and water (500 mL) was prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 5

One hundred grams of BIMS 03-1 (10 wt % of PMS, 0.8 mol % Br) were dissolved in 1000 mL of cyclohexane in a 2-Liter reactor. The polymer cement was heated to 75° C., and 2.0 grams of PIB-amine (KEROCOM PIBA 03 from BASF) were added. The reaction was kept at 75° C. for 1 hour. An aqueous slurry of CLOISITE® Na+ (5.7 g) and water (600 mL) was prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 6

One hundred grams of BIMS 03-1 (10 wt % of PMS, 0.8 mol % Br) were dissolved in 1000 mL of cyclohexane in a 2-Liter reactor. The polymer cement was heated to 75° C., and 0.25 grams of N,N-dimethylhexyl amine (Aldrich) were added. The reaction was kept at 75° C. for 1 hour. An aqueous slurry of CLOISITE® Na+ (5.7 g) and water (600 mL) was prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 7

One hundred grams of BIMS 03-1 (10 wt % of PMS, 0.8 mol % Br) were dissolved in 1000 mL of cyclohexane in a 2 Liter reactor. The polymer cement was heated to 75° C., and 1.2 grams of dimethyl hydrogenated tallowalkyl amine (Armeen DMHTD from Akzo Nobel) were added. The reaction was kept at 75° C. for 1 hour. An aqueous slurry of SOMASIF ME-100 (4 g) and water (600 mL) was prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 8

One hundred grams of BIMS 03-1 (10 wt % of PMS, 0.8 mol % Br) were dissolved in 1000 mL of cyclohexane in a 2 Liter reactor. The polymer cement was heated to 75° C., and 1.2 grams of dimethyl hydrogenated tallowalkyl amine (Armeen DMHTD from Akzo Nobel) were added. The reaction was kept at 75° C. for 1 hour. Aqueous slurry of SOMASIF ME-100 (8 g) and water (600 mL) were prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 9

Fifty grams of BIMS 03-1 (10 wt % of PMS, 0.8 mol % Br) were dissolved in 600 mL of cyclohexane in a 2-Liter reactor. The polymer cement was heated to 70° C., and 1.5 grams of PIB-amine (KEROCOM PIBA 03 from BASF) were added. The reaction was kept at 70° C. for 1 hour. An aqueous slurry of SOMASIF ME-100 (8 g) and water (600 mL) was prepared separately by stirring the slurry at room temperature for 12 hours. The aqueous slurry of clay was added to the polymer cement with vigorous mixing to give a stable emulsion. The emulsion was mixed in the reactor for one hour. The product was precipitated by adding 2000 mL of isopropyl alcohol to the polymer/clay emulsion. The resulting polymer/clay nanocomposite was dried in a vacuum oven at 80° C. for 16 hours.

Example 10

One hundred grams of BIMS 03-1 (10 wt % of PMS, 0.8 mol % Br) were dissolved in 1000 mL of cyclohexane in a 2-Liter reactor. The polymer cement was heated to 75° C., and 1.0 grams of dimethyl hydrogenated tallowalkyl amine (Armeen DMHTD from Akzo Nobel) were added. The reaction was kept at 75° C. for 1 hour. An aqueous slurry of Kenyaite (8 g) and water (600 mL) was prepared separately by stirring the slurry at room temperature for 12 hours. The aqueous slurry of clay was added to the polymer cement with vigorous mixing to give a stable emulsion. The emulsion was mixed in the reactor for 30 minutes, and then mixed in a blender at high speed for 2 minutes. The product was precipitated by adding 2000 mL of isopropyl alcohol to the polymer/clay emulsion. The resulting polymer/clay nanocomposite was dried in a vacuum oven at 80° C. for 16 hours.

Examples 11-22

Procedure A: BIMS 03-1 (10 wt % of PMS, 0.8 mol % Br) was dissolved in 800 mL of cyclohexane at room temperature. To the solution were added: 200 mL water, clay (CLOISITE® Na+, 3.4 g) and N,N dimethylhexyl amine (Aldrich), as indicated. The solution was heated to 70° C. and stirred for 30 minutes. After cooling to room temperature, the solution was poured out and the solvent was evaporated. The product was dried under vacuum at 100° C. overnight. The permeability of the resulting nanocomposite was tested as described above.

Procedure B: Step 1. Clay (CLOISITE® Na+, 3.4 g) and dodecyltrimethyl ammonium chloride (Arquad® 12-37W, Akzo Nobel) are mixed in 200 mL water at 80° C. for 1.5 hours. The mixture was loaded into the reactor and the mixture container was washed with 80 mL water; the washing solution was also added to the reactor. Step 2. To the reactor was added a polymer solution (80 g BIMS 03-1 in 800 mL cyclohexane). The solution container was washed with 10 mL cyclohexane; the washing solution, and if necessary, N,N-dimethylhexylamine, were added to the reactor. Step 3. The solution was heated to 70° C. and stirred for 30 minutes. After cooling to room temperature, the solution was poured out and the solvent was evaporated. The product was dried under vacuum at 100° C. overnight. The permeability of the resulting nanocomposite was tested as described above and the results are presented in Table 3.

TABLE 3

Nanocomposites formed with the emulsifier Arquad® 12–37 W.

| Example | Amine (mg) | Arquad® 12–37 W (g) | Water (mL) | Procedure | Permeation Rate (mm · cc/ m2 · day @ 40° C.) |
|---|---|---|---|---|---|
| 11 | N/A | 1.0 | 200 | A | 96.4; 98.19 |
| 12 | N/A | 1.5 | 200 | A | 91.7; 97.34 |
| 13 | N/A | 2.2 | 200 | A | 97.0; 85.59 |
| 14 | 30 | 1.5 | 200 | A | 91.01; 85.59 |
| 15 | 80 | 1.5 | 200 | A | 91.7; 89.71 |
| 16 | 120 | 1.5 | 200 | A | 90.76; 89.82 |
| 17 | N/A | 1.0 | 200 | B | 100.5; 99.88 |
| 18 | N/A | 1.5 | 200 | B | 93.46; 94.9 |
| 19 | N/A | 2.2 | 200 | B | 100.68; 101.24 |
| 20 | 30 | 1.5 | 200 | B | 101.24; 100.85 |
| 21 | 80 | 1.5 | 200 | B | 98.89; 98.92 |
| 22 | 120 | 1.5 | 200 | B | 94.73; 89.81 |

Examples-23-27

EXXPRO™ (BIMS 03-1, 80 g) and PIBSA (polyisobutylene succinic anhydride) were dissolved in 700 mL cyclohexane in a glass container. The solution was transferred into a mantled reactor. The container was washed with 100 mL of cyclohexane and the washing solution was also added to the reactor. Then, 200 mL water was added with proper pH values (for pH=5, HCl solution was used; for pH=9, NaOH solution was used). After stirring the mixture at 70° C., 3.4 g of CLOISITE® Na+ was added, and the mixture was stirred for 30 minutes. The mixture was poured out and the solvent was evaporated. The sample was dried under vacuum for 24 hours at 100° C. The permeability of the resulting nanocomposite was tested as described above and the results are presented in Table 4.

TABLE 4

Nanocomposites formed with PIBSA as an emulsifier.

| Example | Clay Type: CLOISITE® Na+ (g) | PIBSA (MW = 950) (mg) | Water (mL) | Water pH | Permeation Rate (mm · cc/ m2 · day @ 40° C.) |
|---|---|---|---|---|---|
| 23 | 3.4 | 1.0 | 200 | Neutral | 99.5; 101.0 |
| 24 | 3.4 | 1.5 | 200 | Neutral | 99.5; 107.64 |
| 25 | 3.4 | 2.2 | 200 | Neutral | 103.01; 103.2 |
| 26 | 3.4 | 1.5 | 200 | 5 | 104.76; 100.6 |
| 27 | 3.4 | 1.5 | 200 | 9 | 100.78; 96.94 |

Examples 28-32

EXXPRO™ (BIMS 03-1 80 g) and PIBSA 48 (INFINEUM, USA) were dissolved in 700 mL cyclohexane in a glass container. The solution was transferred into a glass reactor at 50° C. The container was washed with 100 mL cyclohexane and the washing solution was added to the reactor. Then 200 mL water were added with proper pH values (for pH=5, HCl solution was used; for pH=9, NaOH solution was used). After the solution was mixed with clay for 30 minutes, the solution was precipitated with isopropanol. The product was dried under vacuum for 24 hours at 100° C. The permeability of the resulting nanocomposite was tested as described above and the results are presented in Table 5.

TABLE 5

Nanocomposites formed with Amine PIBSA 48 emulsifier.

| Example | Clay Type: CLOISITE® Na+ (g) | Amine PIBSA 48 (g) | Water (mL) | Water pH | Permeation Rate (mm · cc/ m2 · day @ 40° C.) |
|---|---|---|---|---|---|
| 28 | 3.4 | 2 | 200 | Neutral | 98.67; 97.41 |
| 29 | 3.4 | 4 | 200 | Neutral | 100.0; 102.02 |
| 30 | 3.4 | 6 | 200 | Neutral | 96.25; 95.69 |
| 31 | 3.4 | 4 | 200 | 5 | 100.31; 101.13 |
| 32 | 3.4 | 4 | 200 | 9 | 102.15; 103.5 |

Examples 33-36

Nanocomposites Formed with High-Shear Mixing

Example 33

Fifty grams of BIMS 03-1 (10 wt % of PMS, 0.8 mol % Br) were dissolved in 1000 mL of hexane in a 2-L reactor. The polymer cement was heated to 70° C., and 0.05 g of dimethylhexylamine (Aldrich) was added. The reaction was kept at 70° C. for 30 min. Aqueous slurry of Cloisite Na+ (145 g of 2.83 wt % slurry from Southern Clay) and water (350 mL) was prepared separately by mixing the slurry with a high-shear mixer (Silverson L4RT) at 6000 RPM for 30 min. The aqueous slurry of clay and 1.0 g of Propomeen T/12(Akzo Nobel) were added to polymer cement with vigorous mixing to give a stable emulsion. The emulsion was mixed for 15 minutes in reactor, and then mixed in a high-shear mixer (Silverson L4RT) at 6000 RPM for 15 min. The product was precipitated by adding 2000 mL of isopropyl alcohol to the polymer/clay emulsion. The resulting polymer/clay nanocomposite was dried in a vacuum oven at 80° C. for 16 hours.

Example 34

Fifty grams of Exxpro™ polymer (BIMS 03-1: 10 wt % of PMS, 0.85 mol % Br) were dissolved in 1000 mL of hexane in a 2-L reactor. The polymer cement was heated to 70° C., and 0.6 g of dimethyl hydrogenated tallowalkyl amine (Armeen DMHTD from Akzo Nobel) was added. The reaction was kept at 70° C. for 30 min. Aqueous slurry of Cloisite Na+ (145 g of 2.83 wt % slurry from Southern Clay) and water (350 mL) was prepared separately by mixing the slurry with a high-shear mixer (Silverson L4RT) at 6000 RPM for 30 min. The aqueous slurry of clay and 1.0 g of Ethomeen C/12 (Akzo Nobel) were added to polymer cement with vigorous mixing to give a stable emulsion. The emulsion was mixed for 15 minutes in reactor, and then mixed in a high-shear mixer (Silverson L4RT) at 6000 RPM for 15 min. The product was precipitated by adding 2000 mL of isopropyl alcohol to the polymer/clay emulsion. The resulting polymer/clay nanocomposite was dried in a vacuum oven at 80° C. for 16 hours.

Example 35

Fifty grams of BIMS 03-1 (10 wt % of PMS, 0.8 mol % Br) were dissolved in 1000 mL of hexane in a 2-L reactor. The polymer cement was heated to 70° C., and 0.05 g of dimethylhexylamine (Aldrich) was added. The reaction was kept at 70° C. for 30 min. Aqueous slurry of Cloisite Na+ (75 g of 2.83 wt % slurry from Southern Clay) and water (350 mL)

was prepared separately by mixing the slurry with a high-shear mixer (Silverson L4RT) at 6000 RPM for 30 min. The aqueous slurry of clay and 1.0 g of Ethomeen C/12 (Akzo Nobel) were added to polymer cement with vigorous mixing to give a stable emulsion. The emulsion was mixed for 15 min in reactor, and then mixed in a high-shear mixer (Silverson L4RT) at 6000 RPM for 15 min. The product was precipitated by adding 2000 mL of isopropyl alcohol to the polymer/clay emulsion. The resulting polymer/clay nanocomposite was dried in a vacuum oven at 80° C. for 16 hours.

Example 36

Fifty grams of BIMS 03-1 (10 wt % of PMS, 0.8 mol % Br) were dissolved in 1000 mL of hexane in a 2-L reactor. The polymer cement was heated to 70° C., and 0.6 g of dimethyl hydrogenated tallowalkyl amine (Armeen DMHTD from Akzo Nobel) was added. The reaction was kept at 70° C. for 30 min. Aqueous slurry of Cloisite Na+ (75 g of 2.83 wt % slurry from Southern Clay) and water (350 mL) was prepared separately by mixing the slurry with a high-shear mixer (Silverson L4RT) at 6000 RPM for 30 min. The aqueous slurry of clay and 1.0 g of Ethomeen C/12 (Akzo Nobel) were added to polymer cement with vigorous mixing to give a stable emulsion. The emulsion was mixed for 15 min in reactor, and then mixed in a high-shear mixer (Silverson L4RT) at 6000 RPM for 15 min. The product was precipitated by adding 2000 mL of isopropyl alcohol to the polymer/clay emulsion. The resulting polymer/clay nanocomposite was dried in a vacuum oven at 80° C. for 16 hours.

TABLE 6

Permeation measurement results for Examples 33–36.

| Example | Permeation Rate (mm · cc/m2 · day, 40° C.) |
|---|---|
| 33 | 81.86; 81.09 |
| 34 | 74.91; 73.01 |
| 35 | 98.28; 99.35 |
| 36 | 99.14; 98.92 |

Examples 37-43

Nanocomposites Formed with Self Emulsifying Functional Polymers

Example 37

Fifty grams of BIMS 03-1 (10 wt % of PMS, 0.8 mol % Br) were dissolved in 750 mL of toluene in a 2-L reactor. The polymer cement was heated to 80° C. N-methyldiethanolamine (0.5 g, from Aldrich) was dissolved in 100 mL of isopropanol and added to polymer cement. The reaction was kept at 80° C. for 3 hours. Aqueous slurry of Cloisite Na+ (75 g of 2.83 wt % slurry from Southern Clay) and water (225 mL) was prepared separately by mixing the slurry with a high-shear mixer (Silverson L4RT) at 6000 RPM for 20 min. The aqueous slurry of clay was added to polymer cement to give an emulsion, and the emulsion was mixed in a high-shear mixer (Silverson L4RT) at 6000 RPM for 20 min. The product was precipitated by adding 2000 mL of isopropyl alcohol to the polymer/clay emulsion. The resulting polymer/clay nanocomposite was dried in a vacuum oven at 80° C. for 16 hours.

Example 38

Fifty grams of BIMS 03-1 (10 wt % of PMS, 0.8 mol % Br) were dissolved in 750 mL of toluene in a 2-L reactor. The polymer cement was heated to 80° C. N-methyldiethanolamine (0.25 g, from Aldrich) was dissolved in 100 mL of isopropanol and added to polymer cement. The reaction was kept at 80° C. for 3 hours. Aqueous slurry of Cloisite Na+ (75 g of 2.83 wt % slurry from Southern Clay) and water (225 mL) was prepared separately by mixing the slurry with a high-shear mixer (Silverson L4RT) at 6000 RPM for 20 min. The aqueous slurry of clay was added to polymer cement to give an emulsion, and the emulsion was mixed in a high-shear mixer (Silverson L4RT) at 6000 RPM for 20 min. The product was precipitated by adding 2000 mL of isopropyl alcohol to the polymer/clay emulsion. The resulting polymer/clay nanocomposite was dried in a vacuum oven at 80° C. for 16 hours.

Example 39

Fifty grams of BIMS 03-1 (10 wt % of PMS, 0.8 mol % Br) were dissolved in 800 mL of toluene in a 2-L reactor. The polymer cement was heated to 80° C. N,N-dimethylethanolamine (0.1 g, from Aldrich) was dissolved in 100 mL of isopropanol and added to polymer cement. The reaction was kept at 80° C. for 3 hours. Aqueous slurry of Cloisite Na+ (75 g of 2.83 wt % slurry from Southern Clay) and water (225 mL) was prepared separately by mixing the slurry with a high-shear mixer (Silverson L4RT) at 6000 RPM for 20 min. The aqueous slurry of clay was added to polymer cement to give an emulsion, and the emulsion was mixed in a high-shear mixer (Silverson L4RT) at 6000 RPM for 20 min. The product was precipitated by adding 2000 nL of isopropyl alcohol to the polymer/clay emulsion. The resulting polymer/clay nanocomposite was dried in a vacuum oven at 80° C. for 16 hours.

Example 40

Fifty grams of BIMS 03-1 (10 wt % of PMS, 0.8 mol % Br) were dissolved in 750 mL of toluene in a 2-L reactor. The polymer cement was heated to 80° C. N,N-dimethylethanolamine (0.05 g, from Aldrich) was dissolved in 100 mL of isopropanol and added to polymer cement. The reaction was kept at 80° C. for 3 hours. Aqueous slurry of Cloisite Na+ (75 g of 2.83 wt % slurry from Southern Clay) and water (225 mL) was prepared separately by mixing the slurry with a high-shear mixer (Silverson L4RT) at 6000 RPM for 20 min. The aqueous slurry of clay was added to polymer cement to give an emulsion, and the emulsion was mixed in a high-shear mixer (Silverson L4RT) at 6000 RPM for 20 min. The product was precipitated by adding 2000 mL of isopropyl alcohol to the polymer/clay emulsion. The resulting polymer/clay nanocomposite was dried in a vacuum oven at 80° C. for 16 hours.

Example 41

Fifty grams of BIMS 03-1 (10 wt % of PMS, 0.8 mol % Br) were dissolved in 1000 mL of cyclohexane in a 2-L reactor. The polymer cement was heated to 70° C. Triethanolamine (2 g, from Aldrich) was added to polymer cement. The reaction was kept at 70° C. for 2 hours. Aqueous slurry of Cloisite Na+ (75 g of 2.83 wt % slurry from Southern Clay) and water (350 mL) was prepared separately by mixing the slurry with a high-shear mixer (Silverson L4RT) at 6000 RPM for 20 min.

The aqueous slurry of clay was added to polymer cement to give an emulsion, and the emulsion was mixed in a high-shear mixer (Silverson L4RT) at 6000 RPM for 20 min. The product was precipitated by adding 2000 mL of isopropyl alcohol to the polymer/clay emulsion. The resulting polymer/clay nanocomposite was dried in a vacuum oven at 80° C. for 16 hours.

Example 42

Fifty grams of BIMS 03-1 (10 wt % of PMS, 0.8 mol % Br) were dissolved in 1000 mL of cyclohexane in a 2-L reactor. The polymer cement was heated to 70° C. N-methyldiethanolamine (2 g, from Aldrich) was added to polymer cement. The reaction was kept at 70° C. for 2 hours. Aqueous slurry of Cloisite Na+ (75 g of 2.83 wt % slurry from Southern Clay) and water (350 mL) was prepared separately by mixing the slurry with a high-shear mixer (Silverson L4RT) at 6000 RPM for 20 min. The aqueous slurry of clay was added to polymer cement to give an emulsion, and the emulsion was mixed in a high-shear mixer (Silverson L4RT) at 6000 RPM for 20 min. The product was precipitated by adding 2000 mL of isopropyl alcohol to the polymer/clay emulsion. The resulting polymer/clay nanocomposite was dried in a vacuum oven at 80° C. for 16 hours.

Example 43

Fifty grams of BIMS 03-1 (10 wt % of PMS, 0.8 mol % Br) were dissolved in 1000 mL of cyclohexane in a 2-L reactor. The polymer cement was heated to 70° C. N,N-dimethylethanolamine (2 g, from Aldrich) was added to polymer cement. The reaction was kept at 70° C. for 2 hours. Aqueous slurry of Cloisite Na+ (75 g of 2.83 wt % slurry from Southern Clay) and water (350 mL) was prepared separately by mixing the slurry with a high-shear mixer (Silverson L4RT) at 6000 RPM for 20 min. The aqueous slurry of clay was added to polymer cement to give an emulsion, and the emulsion was mixed in a high-shear mixer (Silverson L4RT) at 6000 RPM for 20 min. The product was precipitated by adding 2000 mL of isopropyl alcohol to the polymer/clay emulsion. The resulting polymer/clay nanocomposite was dried in a vacuum oven at 80° C. for 16 hours.

TABLE 7

Permeation Results for Examples 37–43.

| Example | Permeation Rate (mm · cc/m2 · day, 40° C.) |
|---|---|
| 37 | 83.23; 96.05 |
| 38 | 79.59; 82.73 |
| 39 | 93.16; 88.74 |
| 40 | 110.35; 107.26 |
| 41 | 98.36; 98.58 |
| 42 | 88.42; 88.85 |
| 43 | 89.65; 88.06 |

Examples 44-49

Integrated Nanocomposite Processing

Example 44

Polymer Part 1: Four grams of BIMS 03-1 (10 wt % of PMS, 0.8 mol % Br) were dissolved in 1000 mL of hexane in a 2-liter reactor. The polymer cement was heated to 75° C. for 2 hours. Aqueous slurry of Cloisite Na+ (2 g) and water was prepared separately. The aqueous slurry of clay was added to the polymer cement with high shear mixing and 1 g of ethoxylated (5) cocoalkylamine (Ethmeen C/15 from Akzo Nobel) was added to give a stable emulsion.

Polymer Part 2: Forty-six grams of BIMS 03-1 (10 wt % of PMS, 0.8 mol % Br) were dissolved in 500 mL hexane.

The cement of Polymer Part 2 was mixed with the emulsion of Part 1 in a high shear mixer for 15 min. The polymer/clay nanocomposite was precipitated by addition of isopropyl alcohol and dried in a vacuum oven at 85° C. for 16 hours.

Example 45

Polymer Part 1: Six grams of BIMS 03-1 (10 wt % of PMS, 0.8 mol % Br) were dissolved in 1000 mL of hexane in a 2-liter reactor. The polymer cement was heated to 75° C. for 2 hours and 0.8 g of dimethylethanol amine (Aldrich) was added. The reaction was kept at 75° C. for 2 hours. Aqueous slurry of Cloisite Na+ (2 g) and water was prepared separately. The aqueous slurry of clay was added to the polymer cement with high shear mixing and 1 g of ethoxylated (5)cocoalkylamine (Ethmeen C/15 from Akzo Nobel) was added to give a stable emulsion.

Polymer Part 2: Forty-six grams of BIMS 03-1 (10 wt % of PMS, 0.8 mol % Br) were dissolved in 500 mL hexane.

The cement of Polymer Part 2 was mixed with the emulsion of Part 1 in a high shear mixer for 15 min. The polymer/clay nanocomposite was precipitated by addition of isopropyl alcohol and dried in a vacuum oven at 85° C. for 16 hours.

Example 46

Polymer Part 1: Six grams of BIMS 03-1 (10 wt % of PMS, 0.8 mol % Br) were dissolved in 800 mL of toluene in a 2-liter reactor. 0.8 g of dimethylethanol amine (Aldrich) was dissolved in 100 mL isopropanol and added to the polymer cement. The reaction was heated to and kept at 80° C. for three hours. Aqueous slurry of Cloisite Na+ (2 g) and water was prepared separately. The aqueous slurry of clay was added to the polymer cement with high shear mixing and 2 g of ethoxylated (5)cocoalkylamine (Ethmeen C/15 from Akzo Nobel) was added to give a stable emulsion. The emulsion was mixed for 15 minutes.

Polymer Part 2: Forty-six grams of BIMS 03-1 (10 wt % of PMS, 0.8 mol % Br) were dissolved in 500 mL toluene.

The cement of Polymer Part 2 was mixed with the emulsion of Part 1 in a high shear mixer for 15 min. The polymer/clay nanocomposite was precipitated by addition of isopropyl alcohol and dried in a vacuum oven at 85° C. for 16 hours.

Example 47

Polymer Part 1: Four grams of BIMS 03-1 (10 wt % of PMS, 0.8 mol % Br) were dissolved in 800 mL of toluene in a 2-liter reactor. 0.5 g of dimethylethanol amine (Aldrich) was dissolved in 10 mL of isopropanol and added to the polymer cement. The polymer cement was heated to and kept at 80° C. for 3 hours. Aqueous slurry of Cloisite Na+ (2 g) and water was prepared separately. The aqueous slurry of clay was added to the polymer cement with high shear mixing and 2 g of ethoxylated (5)cocoalkylamine (Ethmeen C/15 from Akzo Nobel) was added to give a stable emulsion.

Polymer Part 2: 44 g of BIMS 03-1 (10 wt % of PMS, 0.8 mol % Br) was dissolved in 500 mL toluene.

The cement of Polymer Part 2 was mixed with the emulsion of Part 1 in a high shear mixer for 15 min. The polymer/clay nanocomposite was precipitated by addition of isopropyl alcohol and dried in a vacuum oven at 85° C. for 16 hours.

Example 48

Polymer part 1: Five grams of BIMS 03-1 (10 wt % of PMS, 0.8 mol % Br) were dissolved in 500 mL of toluene in a 2-L reactor. The polymer cement was heated to 80° C. N,N-dimethylethanol amine (0.6 mL, Aldrich) was dissolved in 200 mL of isopropanol and added to the polymer cement. The reaction was kept at 80° C. for 4 hours. Aqueous slurry of Cloisite Na+ (75 g of 2.83 wt % slurry from Southern Clay) in water (400 mL) was prepared separately. The aqueous slurry of clay was added to polymer cement and mixed in a high-shear mixer (Silverson L4RT) at 6000 RPM for 15 min to give a stable emulsion.

Polymer Part 2: 45 g of BIMS 03-1 (10 wt % of PMS, 0.8 mol % Br) was dissolved in 500 mL of toluene. The cement of polymer part 2 was mixed with emulsion of polymer part 1 in a high-shear mixer (Silverson L4RT) for 15 min. The polymer/clay nanocomposite was precipitated by addition of isopropyl alcohol, and dried in a vacuum oven at 85° C. for 16 hours.

Example 49

Polymer part 1: Five grams of BIMS 03-1 (10 wt % of PMS, 0.8 mol % Br) were dissolved in 500 mL of toluene in a 2-L reactor. The polymer cement was heated to 80° C. N-methyldiethanol amine (0.8 mL, Aldrich) was dissolved in 200 mL of isopropanol and added to the polymer cement. The reaction was kept at 80° C. for 4 hours. Aqueous slurry of Cloisite Na+ (75 g of 2.83 wt % slurry from Southern Clay) in water (400 mL) was prepared separately. The aqueous slurry of clay was added to polymer cement and mixed in a high-shear mixer (Silverson L4RT) at 6000 RPM for 15 min to give a stable emulsion.

Polymer Part 2: Forty-five grams of BIMS 03-1 (10 wt % of PMS, 0.8 mol % Br) were dissolved in 500 mL of toluene. The cement of polymer part 2 was mixed with emulsion of polymer part 1 in a high-shear mixer (Silverson L4RT) for 15 min. The polymer/clay nanocomposite was precipitated by addition of isopropyl alcohol, and dried in a vacuum oven at 85° C. for 16 hours.

TABLE 1

Permeation Rate Measurements for Examples 44–49.

| Example | Permeation Rate (mm · cc.m2 · day, 40° C.) |
| --- | --- |
| 44 | 89.6; 94.4 |
| 45 | 96.9; 96.5 |
| 46 | 103.4; 99.4 |
| 47 | 84.9; 90.0 |
| 48 | 82.81; 82.81 |
| 49 | 88.20; 86.32 |

Embodiments of the final nanocomposite of the present invention are useful as air barriers, such as used in producing innerliners for motor vehicles. In particular, the nanocomposites are useful in innerliners and innertubes for articles such as truck tires, bus tires, passenger automobile, motorcycle tires, and the like.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent they are not inconsistent with this specification.

The invention claimed is:

1. A process to produce a nanocomposite comprising the steps of:
   (a) mixing an aqueous slurry of clay with a solution of polymer in an organic solvent to form an emulsion comprising a polymer-clay nanocomposite;
   (b) recovering the nanocomposite from the emulsion.

2. The process of claim 1 wherein the slurry comprises inorganic clay.

3. The process of claim 1 wherein the slurry is essentially free of organoclay.

4. The process of claim 1 wherein the polymer solution comprises halogenated polymer.

5. The process of claim 1 wherein the polymer comprises halogenated isobutylene polymer.

6. The process of claim 1 wherein the emulsion includes an emulsifier.

7. The process of claim 1 wherein the recovery comprises filtering the nanocomposite from at least one phase of the emulsion.

8. The process of claim 1 wherein the recovery comprises precipitating the nanocomposite with an antisolvent.

9. The process of claim 1 wherein the recovery comprises evaporating liquid from at least one phase of the emulsion.

10. A process to produce a nanocomposite comprising the steps of:
    (a) slurrying inorganic clay in water to form an aqueous slurry;
    (b) dissolving halogenated isobutylene polymer in an organic solvent to form a water-immiscible polymer solution;
    (c) emulsifying the slurry with the polymer solution to form a polymer-clay nanocomposite;
    (d) recovering the nanocomposite.

11. The process of claim 10 wherein the emulsification is in the presence of an emulsifier.

12. The process of claim 10 wherein the polymer solution further comprises a polymer chain E comprising an ammonium-functionalized group.

13. The process of claim 11 wherein the polymer solution further comprises a polymer chain E comprising an ammonium-functionalized group.

14. The process of claim 12 or claim 13 wherein the ammonium functionalized group is described by the following group pendant to the polymer chain E:

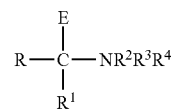

wherein R and $R^1$ are the same or different and are one of a hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions.

15. The process of claim 14 wherein the ammonium functionalized group is selected from the group consisting of N-methyldiethanolamine, N,N-dimethylethanolamine, triethanolamine, or combinations thereof.

16. The process of claim 11 wherein the emulsifier is selected from the group consisting of tertiary amines, diamines, polyamines, amine salts, quaternary ammonium compounds, alkyl glucosides, and ethoxylates.

17. The process of claim 11 wherein the emulsifier comprises alkyl ethoxylate, linear alcohol ethoxylate, amide ethoxylate, amine ethoxylate, or phenol or alkyl phenol ethoxylate.

18. The process of claim 11 wherein the emulsifier comprises coco amine ethoxylate, tallow amine ethoxylate, oleyl amine ethoxylate, or nonyl phenol ethoxylate.

19. The process of claim 10 wherein the inorganic clay comprises silicate.

20. The process of claim 19 wherein the silicate comprises smectite clay.

21. The process of claim 20 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.

22. The process of claim 20 wherein the smectite clay comprises montmorillonite, bentonite, vermiculite, or a combination thereof.

23. The process of claim 10 wherein the isobutylene polymer comprises an interpolymer of a C4-C7 isoolefin and an alkylstyrene.

24. The process of claim 23 wherein the alkylstyrene comprises para-methylstyrene.

25. The process of claim 23 wherein the isoolefin comprises isobutylene.

26. The process of claim 10 wherein the isobutylene polymer comprises functional groups selected from the group consisting of halides, ethers, amines, amides, esters, acids, and hydroxyls.

27. The process of claim 10 wherein the isobutylene polymer is halogenated with bromine or chlorine.

28. The process of claim 10 wherein the solvent comprises alkanes, alkenes, aromatics, nitrated alkanes, halogenated alkanes, or mixtures thereof.

29. The process of claim 10 wherein the isobutylene polymer comprises from 1 to 30 weight percent of the polymer solution.

30. The process of claim 10 wherein the isobutylene polymer comprises from 10 to 25 weight percent of the polymer solution.

31. The process of claim 10 wherein the inorganic clay comprises from 0.1 to 10 weight percent of the aqueous slurry of clay.

32. The process of claim 10 wherein the inorganic clay comprises from 0.3 to 3 weight percent of the aqueous slurry of clay.

33. The process of claim 31 wherein a pH of the aqueous slurry is between 4 and 13.

34. The process of claim 10 wherein the volume ratio of slurry to polymer solution in step (c) is from 0.01:1 to 1:1.

35. The process of claim 10 wherein the volume ratio of slurry to polymer solution in step (c) is from 0.1:1 to 0.9:1.

36. The process of claim 10 wherein the volume ratio of slurry to polymer solution in step (c) is from 0.3:1 to 0.7:1.

37. The process of claim 10 wherein the recovery comprises filtering the nanocomposite from at least one phase of the emulsion.

38. The process of claim 10 wherein the recovery comprises precipitating the nanocomposite with an antisolvent.

39. The process of claim 10 wherein the recovery comprises evaporating liquid from at least one phase of the emulsion.

40. The process of claim 1 wherein the process further comprises the step of:
(c) shaping the nanocomposite to form an innerliner or innertube.

41. The process of claim 10 wherein the process further comprises the step of:
(e) shaping the nanocomposite to form an innerliner or innertube.

42. The process of claim 10 wherein the halogenated isobutylene polymer is a star branched polymer.

43. The process of claim 10 wherein the recovered nanocomposite comprises 10 to 90 phr of the halogenated isobutylene polymer.

44. The process of claim 10 wherein the recovered nanocomposite comprises 1 to 30 phr of the clay.

45. A process to produce a nanocomposite comprising the steps of:
(a) slurrying inorganic clay in water to form an aqueous slurry;
(b) dissolving halogenated isobutylene polymer in an organic solvent to form a water-immiscible polymer solution, wherein the polymer solution further comprises a polymer chain E comprising an ammonium-functionalized group described by the following group pendant to the polymer chain E:

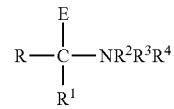

wherein R and $R^1$ are the same or different and are one of a hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions;
(c) emulsifying the slurry with the polymer solution to form a polymer-clay nanocomposite;
(d) recovering the nanocomposite.

46. The process of claim 45 wherein the process further comprises the step of:
(e) shaping the nanocomposite to form an innerliner or innertube.

* * * * *